April 9, 1935.  L. SOMAN  1,997,124
FILM PROJECTING APPARATUS
Original Filed Oct. 19, 1933
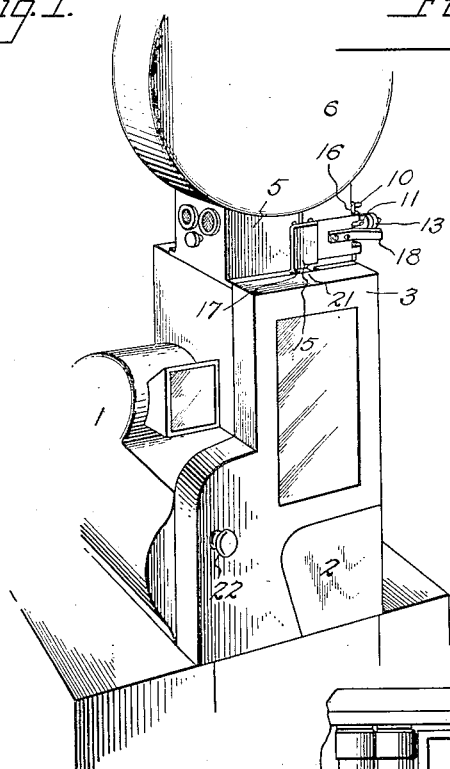
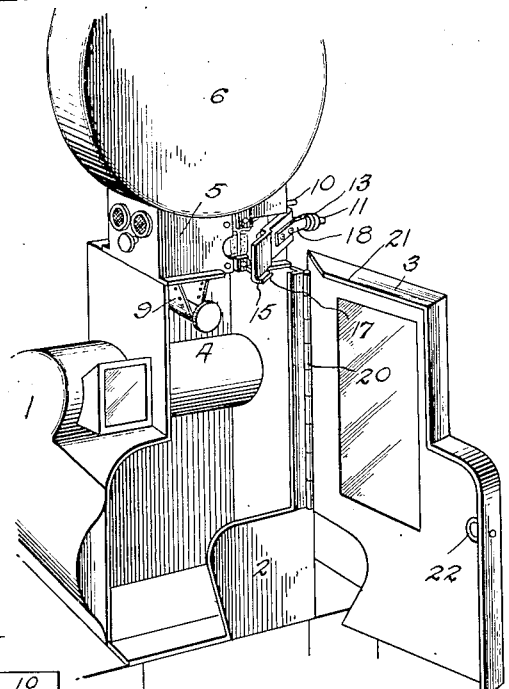
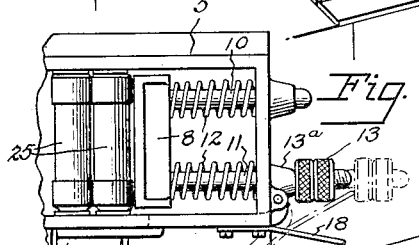
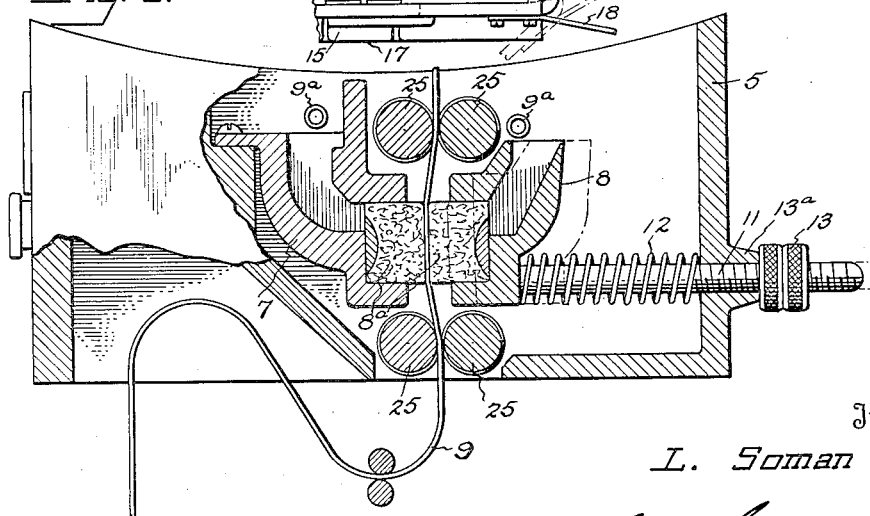
Inventor
L. Soman
By
Attorney Patented Apr. 9, 1935

1,997,124

UNITED STATES PATENT OFFICE 1,997,124

FILM PROJECTING APPARATUS

Lester Soman, New York, N. Y., assignor to Film Treatizor Corporation, New York, N. Y., a corporation of New York Application October 19, 1933, Serial No. 694,294
Renewed October 1, 1934

8 Claims. (Cl. 88—17)

This invention relates to improvements in film projecting apparatus wherein film cleaning means is provided, and is more particularly concerned with provision of means for controlling the relation of the film cleaning means and the film during and following necessary periods of film adjustment in the projector.

The recognized necessity of cleaning and treating the film prior to its passage through the projector and the distinct advantages thereof have produced a problem in the control of the film movement relative to the cleaning apparatus during periods of adjustment of the film at the projector. In conventional film feeding between the reel and projector, provision is made for complete lack of appreciable tension on the film in order to avoid possible breakage or improper projection feeding, and this problem is usually answered by forming a free loop in the film between the guide rollers immediately below the reel and the projector feeding means. In the use of film cleaning means such as ordinarily employed between the reel and this free loop, as the film cleaning means when in use bears on the film with a more or less feeding friction, it is apparent that in the conventional film cleaning means the film is difficult to adjust with respect to the film cleaning means following and during adjustment at the projector with a view to maintaining the necessary free loop.

It is, therefore, of vital importance that the frictional contact of the film cleaning pads or other medium be released during the period of film adjustment at the projector in order that the film at this time may be substantially free of any retarding friction. Of course, the film cleaning means as such requires adjustment for proper cleaning contact with the film without undue friction thereon, and in order to release this cleaning contact during periods of adjustment at the projector, it has heretofore been necessary to manually separate the film cleaning elements through manipulation of their adjusting means, and then after proper adjustment of the projector, readjust the film cleaning elements by hand to a proper cleaning contact. This is not only a time-consuming operation, but presents the further difficulty that a subsequent adjustment of the film cleaning device after film adjustment at the projector is not always properly effective for cleaning, and certainly without the exercise of extreme care is not usually the best effective cleaning contact of the cleaning agents.

The present invention, therefore, is directed primarily to a means by which the film cleaning agents may be held out of contact with the film during the periods of adjustment of the film at the projector or, in fact, any other necessary adjustment of the film, with the restoration of the proper pre-set film contact of these cleaning agents automatically following film adjustment at the projector.

A further object of the invention is to utilize the element which controls the spacing of the film cleaning agents from contact with the film during desired periods of adjustment and which automatically releases these film cleaning agents for succeeding film engagement according to the original set of these agents with respect to the film in the shape of a closure or door covering an opening in the box carrying the film cleaning agents, with this door when opened permitting access to the film cleaning agents, if desired, and with this door so arranged with relation to the door permitting access to the projection apparatus per se as to be automatically closed in the closing of the door of the projection apparatus, whereby on adjusting the film at the projection apparatus and the closing of the door of the projector, the door controlling the adjustment of the film cleaning agents is automatically closed to automatically release the film cleaning agents or film cleaning agent, as the case may be, for proper cleaning contact with the film.

The invention is illustrated in the accompanying drawing, wherein:—

Figure 1 is a perspective view of sufficient of a projection apparatus to illustrate the invention, the respective doors of the projector casing and of the film cleaning box being shown closed.

Figure 2 is a similar view with the doors open.

Figure 3 is an enlarged vertical sectional view through the film cleaning box, the relation of the film cleaners being illustrated in cleaning contact with the film.

Figure 4 is a broken plan view of the film cleaning box showing the means for insuring more or less resilient film cleaning contact of one of the film cleaning agents and the film.

In the drawing, there is more or less conventional showing of a projector casing 1 having an opening 2 closed by a door 3, a projector 4, a guide box 5, and a reel casing 6, from which latter the reel is fed to the projector. The guide box 5 is utilized to contain the film cleaning apparatus, and while a brief description will be given of the general details of the cleaning apparatus shown, it is to be understood that the present invention is in no wise limited to any such details, as any conventional or desired cleaning apparatus capable of use with the essential features of the present invention may be employed.

The film cleaning means per se is of the type disclosed in an application filed by H. J. Blum November 6, 1931, Serial #573,471 now Patent No. 1,972,437, September 5, 1934. This apparatus includes a fixed pad holder 7 and a relatively movable pad holder 8. Each holder is provided with a removable absorbent pad 8a, and the proximate edges of these pads project beyond the holder and provide between them a passage through which the film 9 is directed for cleaning purposes. The pad holders 7 and 8 are of hollow formation, the lower ends being closed by the pads proper and means, such as tubes 8a, are provided to direct appropriate cleaning fluid into the hollow holders for delivery to and absorption by the pads and so presenting film-engaging pad surfaces appropriately charged with the cleaning fluid to be wiped over the opposing surfaces of the film as the latter passes therebetween during projection. The movable pad holder 8 is supported on rods 10 and 11 which pass through the adjacent wall of the box 5 and serve to guide and adjust such pad holder 8 in order that the relation of the pads 8a in their cleaning contact with the film may be properly disposed for efficient cleaning without undue frictional film contact.

Intermediate the guide holder 8 and the proximate wall of the box, the rods 10 and 11 are encircled by springs 12 which insure a limit yielding position of the pad 8a in the holder 8. One of the rods, as 10, is terminally threaded beyond the box 5 and provided with adjusting nuts 13 and means to cooperate with a projection 13ª on the box to thereby limit the movement of the pad holder 8 toward the pad holder 7, i. e. limit the relative positions of the pads in the holders with respect to the film. The adjustment is provided so that the pads may be originally set for the most effective cleaning contact with the film, and further provided for adjusting this contact from time to time should it become necessary. Of course, the adjusting nuts 13 limit the cleaning contact, but it is quite obvious that the pads may be relatively separated by movement of the pad holder 8 against the tension of the spring 12, during which the film is wholly free of any frictional contact between the pads. On release of whatever means is holding the pad holder 8 withdrawn from operative relation of the pad holder 7, the spring 12 will operate to restore the pad holder 8 to a normally operative position, i. e. to that position predetermined as the best cleaning contact between the pads and film.

While it is essential for ordinary purposes that the movable pad holder 8 be guided by two rods 10 and 11, and that each of these rods be provided with a spring 12, it is not absolutely necessary that both rods be provided with adjusting nuts 13 and that obviously adjusting nuts cooperating with one of said rods will limit and control movement and position of the movable pad holder 8. Of course, if desired, both rods may be provided with adjusting nuts, and it is to be understood that so far as this detail is concerned, the invention contemplates the use of a single guide rod or more than two under conditions where such construction would serve.

The box 5 is designed to carry guide rollers 25 arranged in pairs immediately above and below the film cleaning pads. These rollers serve to accurately guide and assist in the delivery of the film to and from the cleaning area and are particularly important in assuring that the film passes to the cleaning agent in a uniform, flat relation and is delivered beyond the cleaning agent in a similar normal condition. This precludes any possibility of film distortion between the cleaning pads, i. e. a particularly effective safety arrangement for the control of the film prior and subsequent to the cleaning operation.

One wall of the box 5 is formed with an opening and in a position and of a size to permit access to and expose the cleaning agents or their connected parts. This opening is designed to be closed by a door 15 hingedly supported. This door is hinged adjacent the end wall through which the guide rods 10 and 11 project, and the hinged edge of the door is provided with a projecting finger which may be engaged behind the adjusting nut 13 on the adjacent rod 10, with the parts so related that when the finger 18 is engaged beneath the adjusting nut 13, the door is held in open position and the rod 10 moved to withdraw the movable pad holder 8 to an appreciable extent from cooperative relation with the pad holder 7, or in other words to separate the film cleaning pads 8a to an extent to completely free the film from any appreciable contact by the pads.

The door 3 of the projector casing, which is hingedly mounted at 20 and opens in the same direction as the door 15, is provided along its upper edge with a flange 21, being further provided with a suitable form of catch or locking means 22 to hold the door 3 closed when desired. The lower edge of the door 15 which closes the opening in the box 5 overlying the cleaning apparatus is provided with an outstanding flange 17, and the door 15 is so arranged that this flange 17 is in the path of movement of the flange 21 of the projector casing door 3.

Assuming that the film cleaning pads 8a have been set for a proper cleaning contact with the film by adjustment of the movable holder 8 through control of the adjusting nuts 13 and that it is necessary or desirable to adjust the film at the projector, the door 3 is opened for this purpose and following this movement the door 15 is opened. As the door 15 is opened, the adjusting nuts, and thereby the rods 10 and 11, are moved slightly to space the pad 8a of the movable holder 8 from cleaning contact with the film. The movement of the adjusting nut 13, or more particularly the rod 10, is such that as the door 15 is opened, the free end of the finger 18 will ride behind the adjusting nut 13 in the position in which it is moved to space the film pad 8a of the holder 8 from film contact. As the described movement of the movable pad holder 8 tensions the spring 12, the cooperation of the free end of the lip 18 of the door 15 with the adjusting nut 13 will hold the movable pad holder 8 in its withdrawn relation and also tend to hold the door 15 open. The film, so far as the film cleaning mechanism is concerned, is thus entirely free of any restriction whatever incident to the cleaning contact of such mechanism, and the desired adjustment of the film at the projector may be carried out without any retarding tension on the film which would tend to interfere with the desired loop formation or movement of the film in the adjustment in the projector.

Following the proper adjustment of the projector or other necessary handling of the film, the door 3 is closed. In the closing movement of this door, the flange 21 thereof contacts with the flange 17 of the door 15 and so tends to move the latter door toward closed position. This closing movement of the door 15 will cause the free end of the finger 18 to ride from behind the adjusting nut 13, whereupon the door 15 is free to close and the movable pad holder 8 is free to move to a position, under the influence of the spring 12, which will cause the pad 8a carried thereby to cooperate with the film in a proper cleaning contact of such film in connection with the pad 8a of the fixed holder 7.

Thus the closing of the door 3 automatically closes the door 15 and automatically releases the movable element of the film cleaning apparatus for a return to a normal film cleaning position and this without the slightest attention on the part of the operator and, more importantly, without requiring the operator to pay any attention to the adjustment of the film cleaning apparatus, for under all circumstances the film cleaning pads return to that film cleaning contact for which the pads were set previous to the necessity for the adjustment of the film. Thus the opening of the door 15 is utilized to wholly relieve the film of any friction incident to the film cleaning apparatus and the film may be adjusted exactly as if the film cleaning apparatus were not present. Following adjustment of the film at the projector, and the closing of the door of the projector casing, the film cleaning apparatus is automatically restored to a normal cleaning relation without the attention of the operator or requiring any additional move on his part whatever.

It is further important to notice in this connection that while the opening of the door 15 may be utilized, and is intended to be utilized, to hold the movable film cleaning pad out of frictional contact with the film, yet the opening of the door provides access to the film cleaning apparatus in order to provide for replacing the pads or determining, if desired, whether the adjustment is that best suited for a proper cleaning operation. Of prime importance in this connection is the fact that the flange 21 of the door 3 overlies the flange 17 of the door 15 and that it is utterly impossible to open the door 15 until the door 3 has been opened. Therefore, access to the film cleaning apparatus is precluded until the door to the projector casing is opened and the door to the cleaning apparatus physically opened when released by the projector casing door.

The film cleaning friction is thus maintained in predetermined set relation during the operation of the projector, with provision for entirely releasing the film from any frictional influence from the cleaning apparatus during the periods in which the film is to be adjusted in the projection apparatus or at other points. The described mechanism provides that during these periods, the film is wholly free of any retarding friction incident to the film cleaning apparatus, with such mechanism designed to insure automatic return of the film cleaning apparatus to the proper film cleaning adjustment simply by closing the door of the projection apparatus. Therefore, access to the cleaners is impossible without first opening the projector casing door, and if the cleaner pads have been moved to release the friction on the film for any purpose of film adjustment necessitating the opening of the projector casing door, the closing of this door will serve to automatically return the film cleaning pads to their normally operative film cleaning relation.

I claim:—

1. A film projection apparatus including a projector casing having a door to afford access to the casing, a film cleaning apparatus arranged above the casing, means to permit access to the film cleaning apparatus, said means being operable to hold the film cleaning apparatus in inoperative relation to the film, and means incident to the closing of the door of the projector casing to automatically restore the film cleaning apparatus to normally operative film cleaning relation.

2. In a film projection apparatus, a projector casing, a door for providing access to the interior of the casing, film cleaning apparatus arranged above the casing, means affording access to the film cleaning apparatus and including an element for holding the film cleaning apparatus free of cleaning contact with the film during such access, and means operated in the closing of the projector casing door to automatically restore the film cleaning apparatus to normal film cleaning contact.

3. A projection apparatus including a casing having a door permitting access thereto, a film cleaning apparatus including elements having a frictional cleaning contact with the film, a door for providing access to the cleaning apparatus, means carried by the door to maintain the film cleaning apparatus out of frictional contact with the film when the door is open, means on the projection casing door to move the door of the film cleaning apparatus to closed position in the closing of the projection casing door, and means in the film cleaning apparatus to automatically restore frictional cleaning contact of the cleaning apparatus with the film on the closing of the door of the cleaning apparatus.

4. In a film projection apparatus, a projector casing, a door providing access thereto, a film cleaning apparatus having normal frictional cleaning contact with the film, a door for providing access to the film cleaning apparatus, means on the door whereby the film may be wholly relieved of the cleaning friction, and means operated in the closing of the door of the projection apparatus for restoring the cleaning friction to the film.

5. A projection apparatus including a casing having a door permitting access thereto, a film cleaning apparatus including adjustable elements having a frictional cleaning contact with the film, a door for providing access to the cleaning apparatus, means carried by the door to selectively maintain the film cleaning apparatus out of frictional contact with the film when the door is open, means on the projection casing door to move the door of the film cleaning apparatus to closed position in the closing of the projection casing door, and means in the film cleaning apparatus to automatically restore frictional cleaning contact of the cleaning apparatus with the film on the closing of the door of the cleaning apparatus.

6. In combination, a projector including a projector casing, a box, a reel, a door on the projector casing, cleaning means in the box, a door on the box for controlling access to the cleaning means, and means between the cleaning means and the last mentioned door to hold the cleaning means in released position when the door is open, the two doors being positioned with reference to each other as to prevent opening of the door on the box without opening the door on the casing.

7. In combination, a projector including a projector casing, a box and a reel, a door on the projector casing, cleaning means in the box, a door on the box for controlling access to the cleaning means, means between the cleaning means and the last mentioned door to hold the cleaning means in released position when the door is open, the door on the box engaging the door on the casing to close the door on the box and release the cleaning means when the door on the casing is closed.

8. In combination, a projector including a projector casing, a box, a reel, a door on the projector casing, adjustable cleaning means in the box, a door on the box, a finger extending from the door adapted when in one position to hold the cleaning means out of contact with the film and when in another position to release the cleaning means for contact with the film, the two doors engaging each other, whereby when the door on the casing is closed the door on the box is closed and the finger released from the film cleaning means.

LESTER SOMAN.